April 12, 1927.
W. J. KASER
1,624,490
METHOD OF MAKING PIES
Filed Dec. 10, 1925
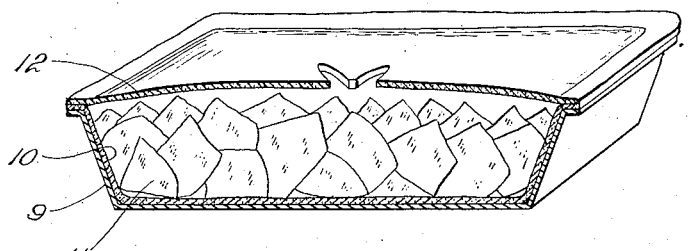
Fig-1-
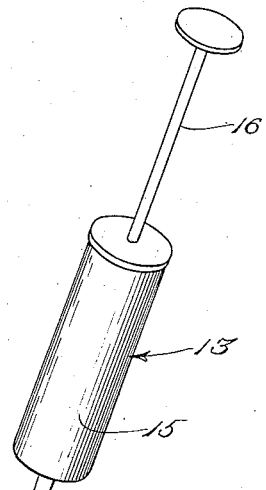
Fig-2-
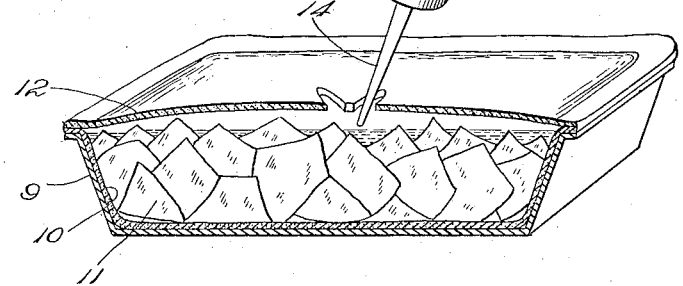
INVENTOR:
William J. Kaser
by
ATTORNEYS Patented Apr. 12, 1927.

1,624,490

UNITED STATES PATENT OFFICE.

WILLIAM J. KASER, OF CHICAGO, ILLINOIS.

METHOD OF MAKING PIES.

Application filed December 10, 1925. Serial No. 74,491.

This invention relates to the manufacture of pies and particularly to the production of fruit pies such as apple, peach, berry, etc., an object of the invention being to provide an improved method or process as a result of which better pies may be made at a material reduction in the cost of production and without the waste of the filler content as heretofore. The present method is particularly adapted for utilization in producing pies on a commercial scale and is also advantageous in the manufacture of relatively small or individual pies sold for example in vending machines which are frequently placed in factories or restaurants.

One of the important objects of the invention is to provide an improved method or process by which fruit pies containing more or less juice may be produced without the loss of any of the juices of the pie during baking, and without any of the juices running out over the crust. It is a well known fact that the juice in fruit pies, particularly apple, peach and berry pies, when baked frequently boils over or escapes from the crust, which is objectionable as rendering the pie less salable, depriving the pie of much of the valuable filler content, and causing an expensive waste thereof, as well as fouling the oven and other appliances. As a result of the present method, it is also possible to utilize more fully all of the parts of the fruit for the pie, and the amount of juice in the pie may be determined or varied as desired.

Other objects of the present invention will appear in the following description and appended claims, reference being had to the accompanying drawings forming a part of this specification wherein:

Fig. 1 is a perspective view illustrating the pie after it has been baked and

Fig. 2 is a similar view showing the manner in which the juices may be supplied to the pie after baking.

Before explaining in detail the improved method or process, I desire to have it understood that the invention is not limited to the apparatus illustrated in the drawings, since the method is capable of being carried out by different forms of apparatus, and that the phraseology which I employ is for the purpose of description and not of limitation.

In carrying out the present method or process, which is particularly designed or adapted for the production of fruit pies such as apple, peach and berry pies, a portion of the juice from a quantity of fruit to be used as the filler for the several pies is preferably removed or extracted in any suitable manner before baking the pie. Thus the fruit may be heated to remove the excess juices, or a certain proportion of the juices, and then the filler supplied within the enclosing crusts and the pie baked. In some cases I find it desirable to first treat the fruit with sugar, and, with or without the application of heat as may be found necessary, remove the resulting syrup or juices from the fruit. I have also found that in the case of certain types of fruit, such as apples or peaches, a greater utilization of the fruit may be made, since the skins and cores of the apples for instance may be cooked to provide an additional syrup, which after baking the pie may be injected or supplied through the crust into the filler.

According to the present invention, I prefer to remove a portion of the juices of the fruit before baking the pie, thus preventing any tendency of the juice boiling over or running out during the baking of the pie, and at the same time reducing the amount of filler which is lost by evaporation under considerable heat. Where a substantial portion of the juice, or the excess juice is removed before depositing the filler in the pan, this juice, after cooking separately and flavoring to taste, may thereafter be supplied in the proper amount to the pie after baking. In addition, a syrup may be prepared from the skins, cores, or other parts of the fruit which are usually thrown away, this syrup combined with the juice extracted from the filler, and the resulting preparation injected or supplied to the pie, after baking, in the desired amount.

In the drawings which are for the purposes of illustration I have shown a pie which is baked in a square pan, this type of pan being used for the production of small individual pies which as above stated are especially adapted for sale in vending machines. The dough which is previously rolled out may be deposited in the pan 9 in the form of a blank 10 which is shaped in accordance with the shape of the pan. Thereafter the filler 11 is deposited upon the blank 10 which forms the lower crust of the pie. It will be understood that this filler, as above described, is preferably treated previously to the deposit thereof in the pan so as to extract or remove a portion of the juice of the fruit. Preferably the juice will be extracted from the fruit to the fullest extent practicable, thereby leaving the fruit substantially dry. Thereafter the top crust 12, preferably in the form of a rolled blank which is previously cut to shape, is deposited over the filler 11. The pie thus formed is subjected to heat in a suitable oven so as to bake the same. This may be done without boiling over, since the juice has been removed from the filler. Thereafter the pie is removed from the oven and as shown in Fig. 2 is conveyed into position to be supplied with a fluid content through the medium of an injector or pump device 13. This injector may be of any desired construction and preferably terminates in a relatively small nozzle or jet 14. In the present instance, the injector is in the form of a pump having a chamber 15 adapted to contain a supply of juice or syrup, and this juice or syrup may be pumped or forced through the jet 14 by operating the handle 16. The pump or injector is preferably constructed so as to supply a predetermined or measured amount of juice or fluid at each operation of the handle 16. When the pie is conveyed into proper position the jet 14 is inserted through one of the relatively small holes usually provided in the crust for the purpose of venting the interior of the pie, and thereupon the juice is injected into the filler between the top and bottom crusts. The jet 14 may have a pointed end so that it may readily pierce the top crust and at the same time making a relatively small hole therein through which the juice may be injected.

It will also be seen from the foregoing that by virtue of the present method, I may supply the pie with a greater amount of juice than heretofore, since the juice normally contained in the filler may be augmented by the syrup made from the skins and cores of apples or from waste parts of other fruits.

The present improved method or process may be carried out by various forms of mechanism, and it will be understood that the apparatus shown in the drawings is merely illustrative of one way in which the invention may be practiced. Therefore, I reserve the right to carry out the method in different ways. For instance, in the production of pies in quantity the pies may be conveyed from the oven in successive sets and delivered to a set of injecting devices, which may be automatically operated to inject or pump the juice or fluid filler in predetermined measured amounts into a plurality of pies at the same time, and may be operated successively as the sets of pies travel successively into proper position with relation to the jets or injecting devices. In this manner pies may be rapidly and economically manufactured, utilizing the present invention, and at the same time resulting in providing pies in which none of the juices or filler content is lost during baking, and wherein the pies may be as juicy as desired and all having uniform or equal fluid filler content.

What I claim is:

1. The hereindescribed method of making a pie which consists in removing juice from a filler, thereafter baking the filler within a crust, and then supplying the juice to the filler.

2. The hereindescribed method of making pastry which consists in extracting the juice from a filler, baking the filler within an enclosing crust, and injecting the extracted juice through the crust into the filler after baking.

3. The hereindescribed method of making a pie which consists in extracting juice with sugar from a fruit filler, baking the filler within an enclosing crust, and thereafter supplying the extracted juice to the filler.

4. The hereindescribed method of making a pie which consists in baking within an enclosing crust an amount of filler sufficient to prevent escape of the juices during baking, and then injecting a fluid ingredient through the crust into the filler to increase the juice content thereof.

5. The herein described method of making a pie which includes baking within an enclosing crust a relatively dry filler and thereafter injecting a fluid ingredient into said filler to render the latter relatively juicy.

In testimony whereof I affix my signature.

WILLIAM J. KASER.